United States Patent [19]
Coker

[11] Patent Number: 5,371,878
[45] Date of Patent: Dec. 6, 1994

[54] SYSTEM FOR ANALYSIS OF EMBEDDED COMPUTER SYSTEMS

[75] Inventor: Robert T. Coker, Centerville, Ga.

[73] Assignee: Ball Corporation, Muncie, Ind.

[21] Appl. No.: 119,000

[22] Filed: Sep. 9, 1993

Related U.S. Application Data

[63] Continuation of Ser. No. 632,939, Dec. 24, 1990, abandoned.

[51] Int. Cl.$^5$ .............................................. G06F 15/20
[52] U.S. Cl. .................................. 395/500; 364/264.3; 364/260.4; 364/267.91; 364/DIG. 1; 395/800
[58] Field of Search ............... 364/578; 395/500, 800; 371/23

[56] References Cited

U.S. PATENT DOCUMENTS

| | | | |
|---|---|---|---|
| 4,644,487 | 2/1987 | Smith | 364/578 |
| 4,727,480 | 2/1988 | Albright | 395/500 |
| 4,901,259 | 2/1990 | Watkins | 364/578 |
| 4,945,503 | 7/1990 | Takasaki | 364/578 |
| 4,954,953 | 9/1990 | Bush | 364/578 |
| 5,056,013 | 10/1991 | Yamamoto | 395/500 |

FOREIGN PATENT DOCUMENTS

| | | | |
|---|---|---|---|
| 0062978 | 10/1982 | European Pat. Off. | G06F 11/00 |
| 0286988 | 10/1988 | European Pat. Off. | G06F 15/20 |

*Primary Examiner*—Eric Coleman
*Attorney, Agent, or Firm*—Gilbert E. Alberding

[57] ABSTRACT

A system can "shadow" the execution of a target-ECS in real time operation, within or without a suite of computers, and record only the necessary information for later re-creation of the real time scenario, without interfacing with the operation of the target-ECS. Such systems include interface means connected by a one-directional bus with the target-ECS and means for converting said input signals to generic input signals, means for converting said generic input signals to unique input events and for providing said unique input events, when needed, to a system connected to said interface means by the bus and including means for storing the unique input events on a permanent storage device during a recording mode and replaying said unique input events during a re-creation mode.

41 Claims, 5 Drawing Sheets

SYSTEM FOR ANALYSIS OF EMBEDDED COMPUTER SYSTEMS

This application is a continuation, of application Ser. No. 07/632,939 filed Dec. 24, 1990 now abandoned.

FIELD OF THE INVENTION

This invention relates to a computer system and method for debugging, verifying and developing an embedded computer system.

BACKGROUND OF THE INVENTION

Computer systems are becoming increasingly complex and frequently include a suite of computers operating together. For example, a military system used to track incoming missiles can divide various tasks necessary to accomplish the desired result, i.e., tracking and destroying the incoming missile, among a plurality of computers operating with a suite of computers. Each of the computers within the suite of computers is termed an Embedded Computer System (ECS) because it is embedded within a hardware system or sub-system. The specific ECS is also referred to as a target system because it is the "target" of development and/or analysis. Reference in this application to a "target-ECS" acknowledges the central role of the computers as the controlling agent of the system.

An ECS is usually programmed to perform a specific set of tasks within the system and operates in an environment generally transparent to the user. In other words, an ECS normally executes software in which the user interface is implemented as a system interface, e.g., a user interface of a computer controlled microwave oven. Hence, if hardware, software or interface problems occur within the ECS, the user may be informed that an error occurred within the ECS but has no means to interrogate the ECS and isolate the error.

Under controlled test conditions, the problem of debugging and developing an ECS has been remedied to a degree by connecting the ECS to an In-Circuit Emulator (ICE). An ICE is physically connected to the target-ECS, e.g., by an electrical connection plugged into the central processor socket on the ECS, and includes some type of control unit to interrogate, debug and develop the ECS.

A severe limitation in using an ICE to debug and develop ECS's is the amount of data necessary to re-create real time scenarios in which problems occurred. The real time data available for such purposes is generally limited by the amount of data that can be saved from instrumented flight and hot bench tests, which has proven to be inadequate to re-create an entire real time scenario.

Moreover, in current use an ICE is connected directly to the target-ECS. Thus, in an attempt to repeat a real time scenario, the target-ECS and its stimulus system must be used. The target-ECS and its stimulus system are typically expensive and limited resources.

Existing ECS data recording systems attempting to record sufficient data to re-create a real time scenario have proven to be expensive, unreliable and time consuming. Such systems typically cannot record or re-create the internal states of a target machine; must preprocess data before they can be used to analyze the real time events; require modification of the target system hardware and/or software; and require complex and cumbersome hardware inapplicable to real time flight tests.

The development and analysis of target systems on simulation systems typically results in efforts to work around the errors and limitations of the simulation. Currently, target systems are being considered acceptable if a very limited amount of data can be processed within the target system without producing any errors. Many of these same systems which are considered successful in a laboratory environment are producing unacceptable errors when introduced into a real operating environment where the types and sequence of data received by the target system are different from the data of the laboratory test.

Thus, nearly insurmountable integration and support problems result from providing an ECS to a user which, because of the inability to debug and verify the ECS reliably, produces run-time errors during real time execution. If the ECS is tested to determine the source of error, it will not necessarily produce the error when the original test data is used in an attempt to re-create the data input to the system. There is no assurance that the set of limited test data can be used to produce the same sequential events and corresponding execution states within the ECS which produced the run-time error.

DISCLOSURE OF THE INVENTION

This invention provides means to re-create an entire real time scenario of a target-ECS without interfering with the operation of the target-ECS, even if embedded in a suite of computers, and provides the ability to debug and verify a target-ECS on a separate computer system independent of the target-ECS.

In general, this invention uses hardware and software which can "shadow" the execution of a target-ECS in real time operation, within or without a suite of computers, and record only the necessary information for later re-creation of the real time scenario, without interfering with the operation of the target-ECS. Systems of the invention include interface means connected by a one-directional bus with the target-ECS and having means for receiving input signals from said target-ECS and converting said input signals to generic input signals, means for converting said generic input signals to unique input events and for providing said unique input events when needed, and a host system connected to said interface means via a bus and having means for storing said unique input events on a permanent storage device during a recording mode and replaying said unique input events during a re-creation mode. The "host system" saves the information to a permanent storage device for later re-creation of the real time events and can control a shadow system and a commercially available ICE to interrogate and debug the target-ECS software on the shadow system.

A shadow system of this invention executes the same software as the target-ECS from system start-up or reset. The shadow system, however, does not have all of the complex input-output (I/O) registers unique to the target-ECS, e.g., universal asynchronous receiver transmitter. Instead, the shadow system receives its input data from the input registers of the target-ECS and stores the input data in its RAM. Thus, rather than receiving input data from an external source and reading the data into complex I/O registers, the shadow system uses the data value and relative time of input events from the target-ECS and writes the value directly to its RAM using its internally generated location. Using the address of unique input events in a specially segregated portion of its RAM, the shadow system central processing unit (CPU) can perform numerical operations on the data with its microprocessor and similarly send outputs to specific locations within its RAM rather than to complex output registers. By operating on input data with the same value, memory location and relative timing as the target-ECS, the shadow system has an execution state at any given time corresponding to a known execution state in the target-ECS and can produce a mirror-image or "shadow" of the target-ECS.

The shadow system and the target-ECS function exactly the same except that the shadow system receives data slightly delayed because of a data buffer between the target-ECS and the shadow system. When recording of unique input events begins, a host system halts the shadow system (which could be a reset state in some embodiments) and re-directs the unique input events from the shadow system to the host system where the unique input events are recorded on a permanent storage device. At the end of recording, the host system reads the execution state of the shadow system (which has not changed since the beginning of recording because it was halted) and records the execution state on the permanent storage device. The unique input events can then be re-directed back to the shadow system which executes its software utilizing the unique input events from the saved execution state forward. Thus, the recorded data is not used during the real time scenario but is only used later for test, debug and development purposes. If another recording takes place, the above process is repeated, starting with the target-ECS and shadow system in the same execution state.

After the data recording of a real time scenario is completed, the data can be replayed through the shadow system and the real time events re-created without interference with the target-ECS. The host system can control the shadow system and retrieve the unique input events from the permanent storage device to be replayed through the shadow system to debug, verify and further develop the target-ECS. Using this invention, large amounts of re-created test data can be repetitively analyzed with relative low cost resulting in an increase in ECS reliability and dependability.

BEST MODE FOR CARRYING OUT THE INVENTION

Figure 1:
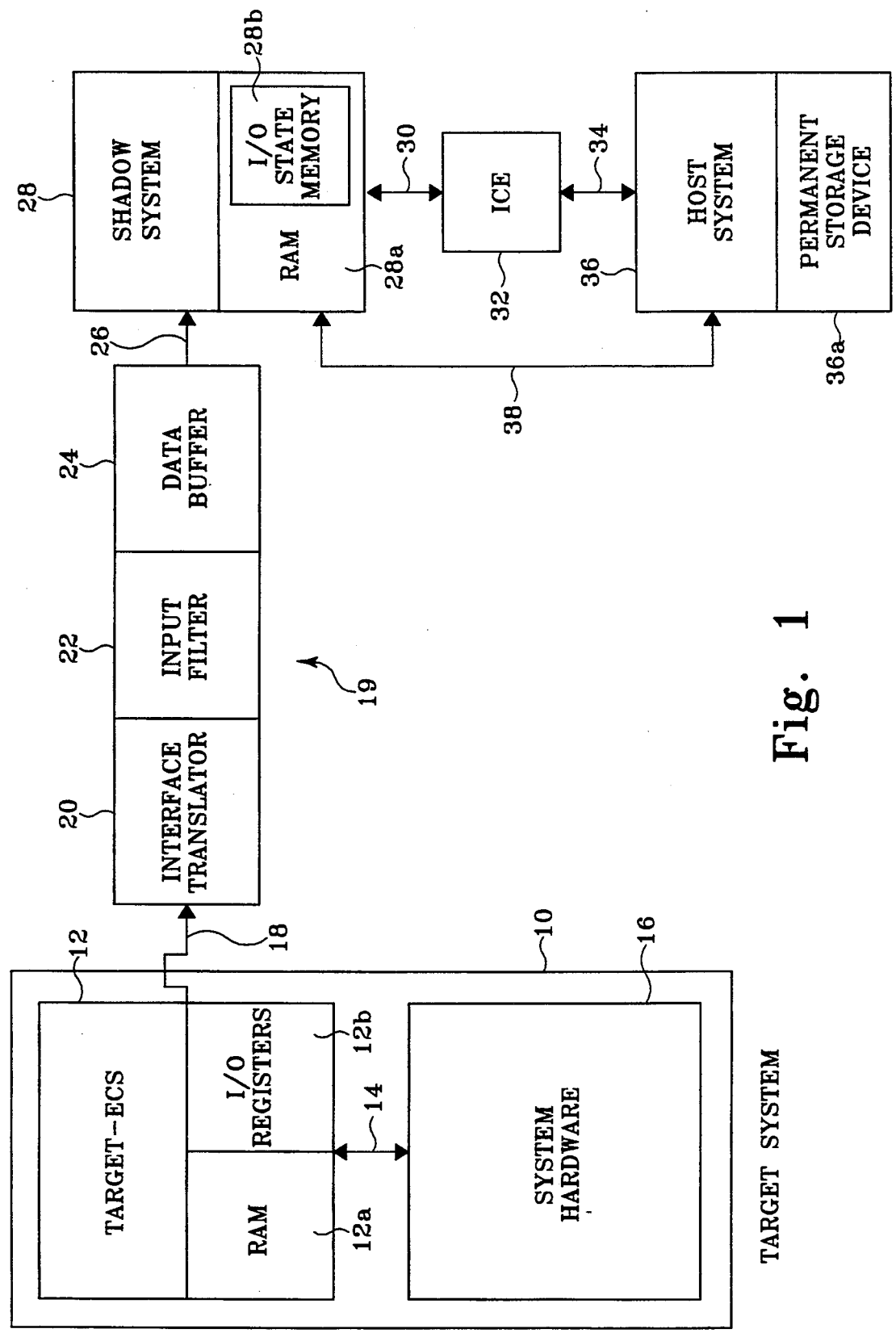
FIG. 1 is a schematic diagram of one embodiment of the invention.

FIG. 1 illustrates one embodiment of this invention. The arrows indicate the direction in which data is transmitted between the invention elements. The target system includes one or more embedded computers operating together to control the system hardware. FIG. 1 shows the target-ECS 12 connected to the system hardware 16 by a bi-directional bus line 14 allowing communication in either direction between the target-ECS and the system hardware. The system hardware 16 can include I/O hardware and/or other ECS's.

Figure 4:
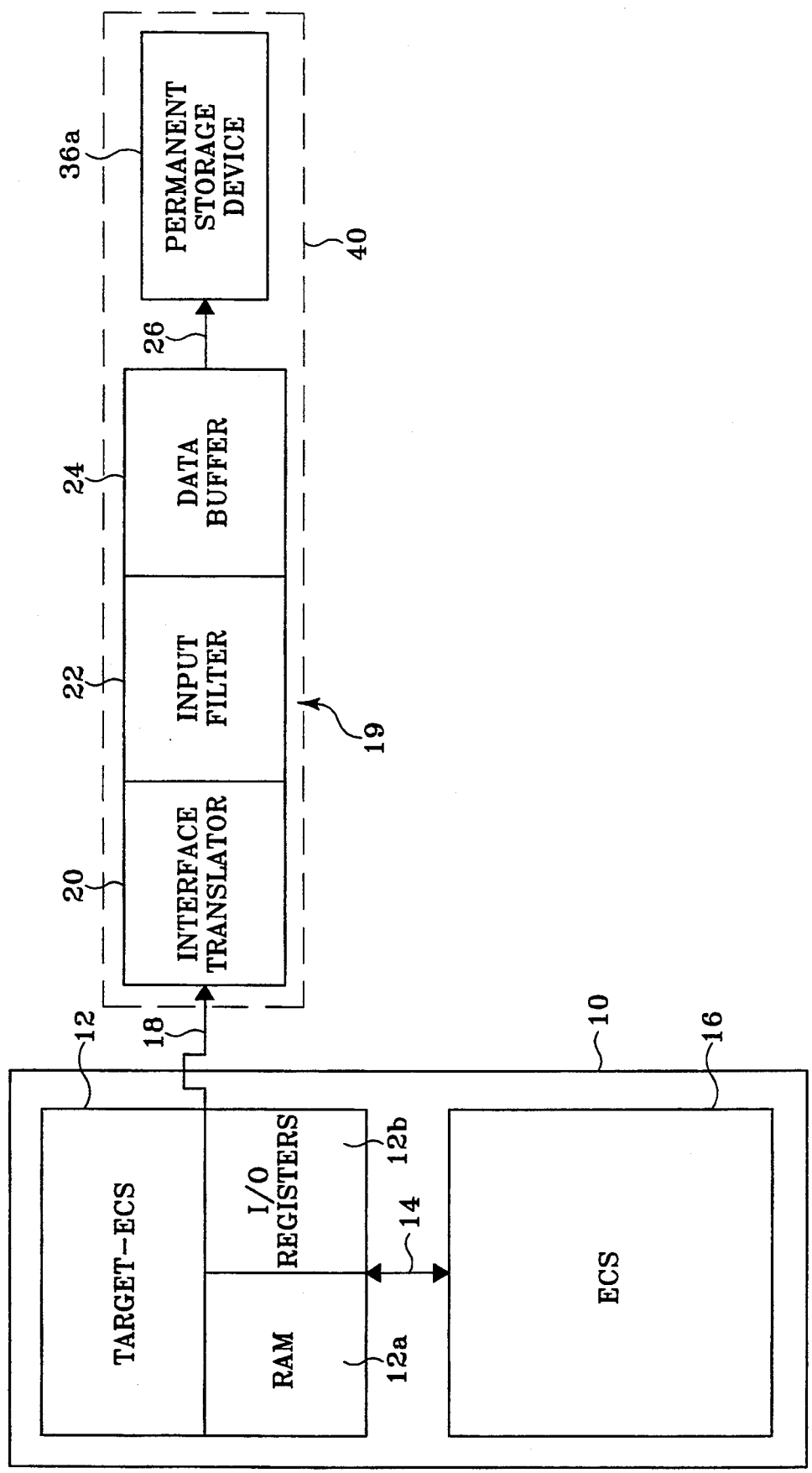
FIG. 4 illustrates an embodiment of the invention for recording unique input events in environments with space and weight restrictions.

The target-ECS 12 is connected by a one-directional bus 18 with an interface means 19 comprising means 20 for receiving input signals from the target-ECS and converting the input signals to generic input signals, means 22 for converting the generic input signals to unique input events and providing said unique input events at the first opportunity to a connected shadow system 28 or host system 36. The interface means 19 includes, as shown in FIGS. 1 and 4, an interface translator 20, an input filter 22 and a data buffer 24.

Data is sent over a one-directional bus 18 from the target-ECS 12 to the interface translator 20. The interface translator is designed for each type of target-ECS and comprises means to convert the input signal received from the target-ECS to a generic signal which is transmitted to the input filter 22. The input filter 22 includes means to convert the generic input signal received from the interface translator 20 into unique input events to be used by the shadow system 28 and transmits the unique input events to the data buffer 24 where the unique input events are temporarily stored until the shadow system 28 is ready to receive the unique input events. If the shadow system 28 is ready to receive data and no data is currently stored in the data buffer 24, the shadow system 28 halts execution of instructions and waits until the next unique input event is available from the data buffer 24. The shadow system 28 is designed to execute at an average rate that is equal to or greater than the target-ECS 12. However, if the data buffer 24 becomes full of unique input events, an error condition will be declared.

The shadow system 28 includes and executes the same software and input signals (after being converted by the input filter 22 to unique input events) as the target-ECS 12. The primary difference between the target-ECS 12 and the shadow system 28 is that the shadow system 28 does not include all of the complex I/O registers 12b included in the target-ECS 12 and sends the data from the unique input events received from the input filter 22 directly to a portion 28b of its RAM 28a that is segregated to store such information. Portion 28b is defined as an I/O state memory 28b.

The shadow system 28 is connected to an ICE 32 via an electrical connection 30. The ICE 32 is a commercially available system allowing the shadow system 28 to be controlled and debugged. During the re-creation mode discussed further below, the ICE 32 co-acts with the host system 36 and provides interrogation and debugging of the shadow system 28 using data stored on a permanent storage device 36a. In an alternative embodiment, not shown, a commercially available co-processor development board can be substituted for and function the same as the ICE 32.

The ICE 32 is connected to a host system 36 which provides high level control of the shadow system 28 and ICE 32 via an electrical connection 34. The host system 36 functions as a user and data interface for the ICE 32, and in a preferred embodiment of the invention the host system 36 controls both the shadow system 28 and ICE 32. The host system 36 includes a permanent storage device 36a and records all necessary data, i.e., the unique input events and corresponding starting execution state of the target-ECS 12, on the permanent storage device 36a for replay during a re-creation mode.

As data is received by the target-ECS 12 from an external source, it is stored in input registers where it can be accessed by the target-ECS CPU. In addition to standard input events, such as input fetches as a result of executing an input instruction, embodiments of the invention also include memory mapped and dynamically mapped input events. Memory mapped input events are defined as an operated fetch that is the result of the target-ECS 12 executing a memory read instruction to a memory address used to access devices that receive data from any device other than the target-ECS 12. For example, a read instruction to a specific memory address could cause the target-ECS 12 to read data from an external device. Dynamically mapped input events are defined as memory mapped input events which have constantly changing and updated memory addresses. The target-ECS 12 includes status and address lines indicating whether an input event is standard, mapped or dynamically mapped. The status and address lines are decoded by an interface translator 20. If the input event type is standard, only the status lines are decoded, and if the input event type is mapped or dynamically mapped, both the status and address lines are decoded. Memory Mapped input events are decoded by using prom section and sub-section bit maps to identify the Memory Mapped addresses. Dynamically Mapped input events are decoded by using prom section and RAM sub-section bit maps. A RAM bit map position is set when data is externally loaded into its memory location. When the target-ECS reads a location with a set bit map, a unique input event is created and the RAM bit map location is cleared.

Figure 2:
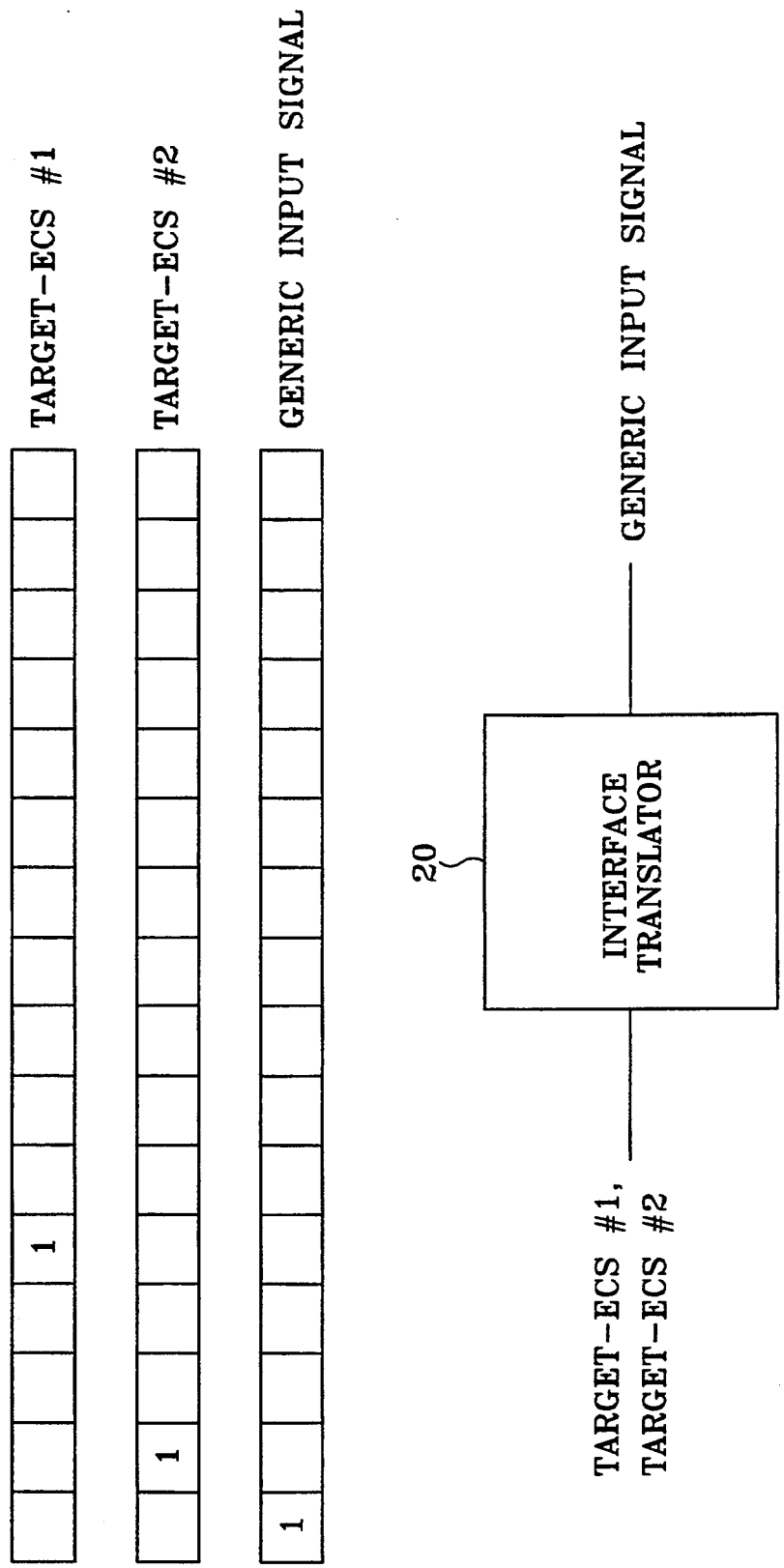
FIG. 2 illustrates a typical input signal conversion by the interface translator from any target system to a generic signal to be used by the shadow system.

The interface translator 20 receives signals from the target-ECS 12 containing a group of bits in a data word particular to a given type target-ECS 12. The interface translator 20, which has been designed for use with the given type target-ECS, rearranges the bits to produce a generic input signal which is sent to the input filter 22. For example, as shown in FIG. 2, the input signal received from one target-ECS, target-ECS #1, may reserve bit number 4 of the data word for a special flag while an input signal received from another target-ECS, target-ECS #2, may reserve bit number 2 for the same purpose. The interface translator 20 provides a generic input signal by rearranging and/or decoding the bits received from either given type target-ECS so that bit number 1 indicates the special flag. In this manner, only the interface translator 20 need be specifically designed to match a given type target-ECS with a generic shadow system with the same type CPU. Hence, this invention is adaptable to any target-ECS with minimum hardware reconfiguration.

The input filter 22 receives generic input signals from the interface translator 20 and converts the generic signals to unique input events which can be utilized by the shadow system 28. Each unique input event consists of a 16-bit synchronization word and a 16- or 32-bit input data word depending on the data bus size of the target-ECS 12. The synchronization word contains a "special input data flag" with 1 bit, a "sync-clock" with 7 to 15 bits indicating the number of data strobes or clock cycles executed by the target-ECS 12 since the last unique input event and an optional "wait-clock" with 0 to 8 bits indicating the number of non-emulated target-ECS clock cycles during a target-ECS "wait state" which is defined as a period of time during which the target-ECS is in a non-executing idle state.

If the generic signal received by the input filter 22 from the interface translator 20 is for a normal data type such as standard, memory mapped or dynamically mapped, the special input data flag in the synchronization word is set to zero (0). If, however, the generic input signal received from the interface translator 20 indicates a special data type, the special input data flag is set to one (1) and four bits of the input data word are reserved to indicate the type of special input data. Although other special input data types are within the scope of this invention, the special input data types comprising the "special" unique input events preferably used in this invention include:

(1) Roll Over—Indicates that the sync-clock or wait-clock will roll over, i.e., to be set to 0 before the next target-ECS data strobe or clock cycle can occur. The remaining bits of the data word are not used.

(2) First In/First Out (FIFO) Overflow—Occurs when the input signal received by the target-ECS overruns the Data Buffer. The remaining bits of the data word are not used.

(3) Vectored Interrupt—Occurs when the target-ECS executes a vectored interrupt, i.e., an interrupt to a specific memory location. The remaining bits of the data word contain the interrupt vector.

(4) Non-Vectored Interrupt—Occurs when the target-ECS executes a non-vectored interrupt. The remaining bits of the data word identify the non-vectored interrupt.

(5) External Time—Occurs when an external time signal is used to synchronize the target-ECS 12 and shadow system 28 to the external time source within one target-ECS data strobe or clock cycle. The remaining bits of the data word contain time synchronization data.

(6) Reset—Created by a discrete input on the target-ECS reset line.

(7) Block Identification—Created by an optional multiplexer-de-multiplexer to identify blocks of input data received by the host system 36 through more than one input channel 38.

(8) Input Address—Created by the shadow system in simulation mode to request the data for an input event from an external simulator, e.g., a radio frequency threat simulator. In addition to the synchronization word and the blank input word, a third word with the address of the input register is generated. After generating this event, the shadow system will wait for the simulator to provide the input event through the host system.

(9) Output Address—Created by the shadow system in simulation mode to provide the data of output events to an external simulator. In addition to the synchronization word and the input word which contains the output data, a third word with the address of the output register is generated. The simulator uses this output data for the closed loop simulation of the input data.

(10) Shadow Control—Created by the host system 36 to place the shadow system 28 in one of 4 different operating modes. The remaining bits of the input data word are reserved as input to a reserved location within the shadow system 28. The four different operating modes of the shadow system 28 include:

(a) Shadow Mode—Used to create the exact execution state of the target-ECS 12 at the start of recording the unique input events. The shadow system CPU is halted at the beginning of recording, the shadow system 28 is placed in a recording mode and the input data words are redirected through a parallel interface directly to the host system 36 where the unique input events are recorded on a permanent storage device 36a. These unique input events are not available to the shadow system 28 until it is placed in re-creator mode by the host system 36. At the end of recording, the host system 36 reads the execution state of the shadow system 28 which is then recorded on the permanent storage device 36a. It is necessary at the beginning of the shadow mode that the shadow system 28 be set by the host system 36 to the same execution state as the target-ECS.

(b) Recording Mode—Mode immediately following the shadow mode whereby the unique input events are redirected to a permanent storage device 36a as discussed above.

(c) Re-creation Mode—Allows the shadow system 28, ICE 32 and host system 36 to replay recorded data back through the shadow system 28 to re-create the recorded real time scenario without accessing the target-ECS 12. Because the shadow system 28 was set to the known execution state at the beginning of data recording, the host system 36 must return the shadow system 28 to the same known execution state. After the shadow system 28 is returned to the known state, the recorded input events are sent to the shadow system 28 to re-create the real time scenario.

(d) Simulator Mode—A variation of the Recreator mode that allows the shadow system 28 to request, send and receive data over the parallel interface 38 to and from an external simulator connected to the host system 36. This allows the external stimulus to be synchronized with a recreated recorded scenario and then allows the shadow system to be switched from the recorded scenario to a simulated continuation of the recorded scenario.

The data buffer 24 is a standard FIFO data buffer. The unique input events received from the input filter 22 are either sent directly to the shadow system 28 if it is ready to receive the data, or temporarily stored until the data can be received by the shadow system 28.

Figure 3:
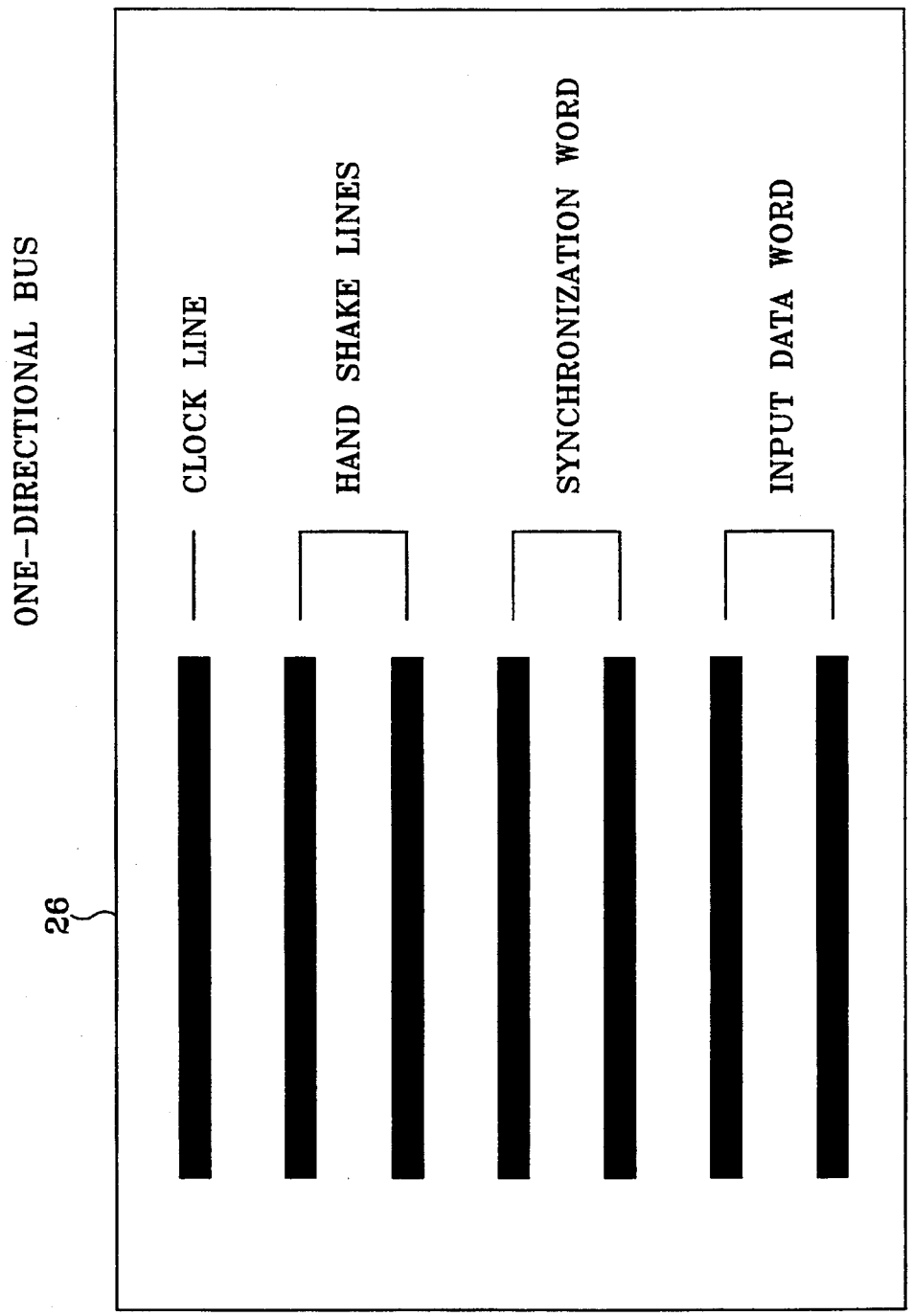
FIG. 3 illustrates a representative layout of a one-directional bus extending from the input filter to the shadow system.

The one-directional bus 26 extending from the input filter 22 to the shadow system 28 contains seven or nine lines. FIG. 3 illustrates a schematic layout of a seven-line bus used in target-ECS's having a 16-bit input data word. One line is reserved for a clock line; two lines are used for hand shake signals, i.e., to verify communication has been established and can proceed; two serial lines are used for the 16-bit synchronization word, with a parity bit transmitted with each serial byte; and two lines are used for the 16-bit input data word, with a parity bit transmitted with each serial byte. A target-ECS with a 32-bit data word requires two more lines for the 16 additional input data word bits.

The shadow system 28 of FIG. 1 has the same CPU and executes the same software as the target-ECS 12. However, rather than having all of the complex I/O registers 12b of the target-ECS 12, the shadow system 28 has an I/O state memory 28b which stores the data from the unique input events of the target-ECS 12, and the data from the output events of the shadow system 28. The I/O state memory 28b is a section of the shadow RAM 28a segregated for storage of the I/O data of the shadow system 28. The shadow system CPU receives and processes data from unique inputs from this I/O state memory 28b the same as the target-ECS 12 processes inputs from its I/O registers 12b.

The shadow system 28 is the same finite state sequential machine as the target-ECS 12. In other words, at any given point in time during execution of the input events, the execution state of the shadow system 28 directly corresponds to the execution state of the target-ECS 12 at the same relative point in time. The execution state of the shadow system 28 is defined as including the contents of its RAM 28a, I/O state memory 28b, and internal registers of the ICE 32. In contrast, the execution state of the target-ECS 12 is defined as including the contents of its RAM 12a, internal registers and I/O registers 12b. For purposes of re-creating the execution states which existed in the target-ECS 12, the shadow system 28 and target-ECS 12 execute as identical finite state machines even though the shadow system 28 does not have the complex I/O registers 12b included in the target-ECS 12.

In particular, input data from the unique input events received by the shadow system 28 are read into the I/O state memory 28b at locations corresponding to the memory location of the unique input events within the I/O registers 12b of the target-ECS 12. In other words, the memory address of any given unique input event within the shadow system I/O state memory 28b directly corresponds to the memory address of the same unique input event within the target-ECS I/O register 12b. Thus, the execution state of the shadow system 28 can be used to re-create the execution state of the target-ECS 12 at any given time during the recording of the input data.

In terms of actual time, the execution states of the shadow system 28 will lag slightly behind that of the target-ECS because of the slight time delay while input events are temporarily stored in the data buffer 24. But in terms of relative time, the execution state of the shadow system 28 at the time when any given instruction is executed will directly correspond to the execution state of the target-ECS 12 when the same instruction was executed.

An execution state, including the contents of RAM and I/O registers in the target-ECS and RAM and I/O state memory in the shadow system, can further be defined as including an input state vector, output state vector and internal state vector. Input and output state vectors are defined as the contents of input and output registers respectively in the target-ECS and as the contents of the I/O memory state in the shadow system. Internal state vectors are defined as the contents of RAM and internal registers, i.e., interrupt and status registers, of both the target-ECS and the shadow system. Defining an execution state as including an input state vector, output state vector and internal state vector allows this invention to be incorporated into any target system 10 with an embedded finite state sequential machine as a target-ECS.

The ICE 32 provides the ability to interrogate and control the shadow system 28. Although the ICE 32 is a commercially available system, it must be matched to each particular target-ECS type, with firmware which does not interfere with the control of the shadow system 28 by the host system 36. The connection means used to connect the ICE 32 to the shadow system 28 could be an electrical connector which plugs into the microprocessor socket of the shadow system 28 or any other commonly used connection means. The ICE 32 must have software which is compatible with the shadow system 28, i.e., can coact with the shadow system 28 software to allow control of the shadow system 28.

The host system 36 provides high level control over the shadow system 28 and ICE 32. It is connected to the shadow system 28 via the ICE 32 and also via a parallel interface 38 to the I/O FIFO of the shadow system 28. The host system 36 can send special unique input events to the shadow system 28 via the parallel interface 38 during the simulation modes. The host system 36 coacts with the ICE 32, i.e., reading the execution state of the shadow system 28 or redirecting input events to the permanent storage device 36a, to provide high level control of the shadow system 28.

In a preferred embodiment of the invention, the host system 36 coacts with the ICE 32 to set the execution state of the shadow system 28 including any Memory Management Unit (MMU) that may be used. If the execution state of the shadow system 28 cannot be set, the recording will not be able to begin until the execution state of the target-ECS 12 corresponds to the execution state of the shadow system 28.

The host system 36 is connected to a permanent storage device 36a capable of storing all data necessary to re-create a real time scenario for debug, verification and development purposes. The permanent storage device 36a must have at least 100 megabytes of storage capacity to store an adequate amount of data. Commercially available hard drives having at least 100 megabytes of storage capacity are small enough in weight and size to allow use during the real time scenario, e.g., avionic flight test, and will withstand the shock and vibration stresses placed on the system.

FIG. 1 shows a preferred embodiment of the invention having the permanent storage device 36a integrally included as part of the hardware of the host system 36 to reduce the number of basic components comprising the invention. Other embodiments having the permanent storage device 36a functionally connected to the host system 36 but not physically incorporated therein are included within the scope of this invention.

A key feature of this invention is that only a portion of the instructions and data processed by the target-ECS need be recorded on the permanent storage device 36a to exactly re-create all executions states which existed in the target-ECS 12. It is estimated that approximately 3 percent of the execution time used by an ECS is for processing I/O events including I/O instructions and I/O data. The shadow system uses only the input events (not output events) received by the target-ECS and the corresponding execution states of the shadow system to exactly re-create all the execution states of the target-ECS. Because ECS's tend to be output heavy, i.e., are generally used to drive external hardware and thus usually have more output than input, an estimate of unique input events actually stored on the permanent storage device as compared to data operated on by the target-ECS is about 1.5 percent (half of the 3 percent I/O estimate). Thus, only a minimum data set is needed during the re-creation mode with a consequent reduction in required storage capacity.

To further reduce required data storage capacity, this invention employs unique methods of rearranging and combining unique input events to provide a minimum data set from which target-ECS execution can be re-created. In particular, unique input events recorded on the permanent storage device are defined as including input data and the number of data strobes or clock cycles since the last unique input event was received by the shadow system. In an alternative definition, the set of unique input events also includes the number of clock cycles during which the target-ECS is in a wait state. Further, if a unique input event is received by the shadow system having data which is identical to data contained in a corresponding memory location, i.e., an address in the I/O state memory 28b, the data is not recorded for a second time. Finally, in embodiments of the invention having a target-ECS with two co-processors and I/O data global to the internal registers of each, the data is recorded only once on the permanent storage device. Thus, a large quantity of data with a minimum storage size can be utilized to debug, verify and develop a target-ECS.

FIG. 4 illustrates an embodiment of the invention intended to be used in environments with space and weight restrictions, e.g., flight tests with limited space available for additional electronic hardware. Under such circumstances, it may be desirable to omit the shadow system 28, the ICE 32 and the host system 36 from the basic configuration during the data recording process and re-create the real time scenario by replaying the data through the shadow system 28 and ICE 32 in a laboratory environment. As shown in FIG. 4, the input events are transmitted from the input filter 22 directly to the permanent storage device 36a. The interface translator 20, input filter 22, data buffer 24 and permanent storage device 36a can all be packaged together as a single unit 40 for ease of transport, set-up, etc. Because the target-ECS 12 must be at a known execution state at the beginning of data recording to re-create the real time scenario, the data recording must typically begin from power-up, or system reset. After recording the unique input events during a flight test, the permanent storage device 36a can be connected with a host system 36 which is connected to the shadow system 28 and ICE 32, as shown in FIG. 1, allowing the unique input events to be replayed through the shadow system 28 to provide debug and verification of the shadow system 28.

Figure 5:
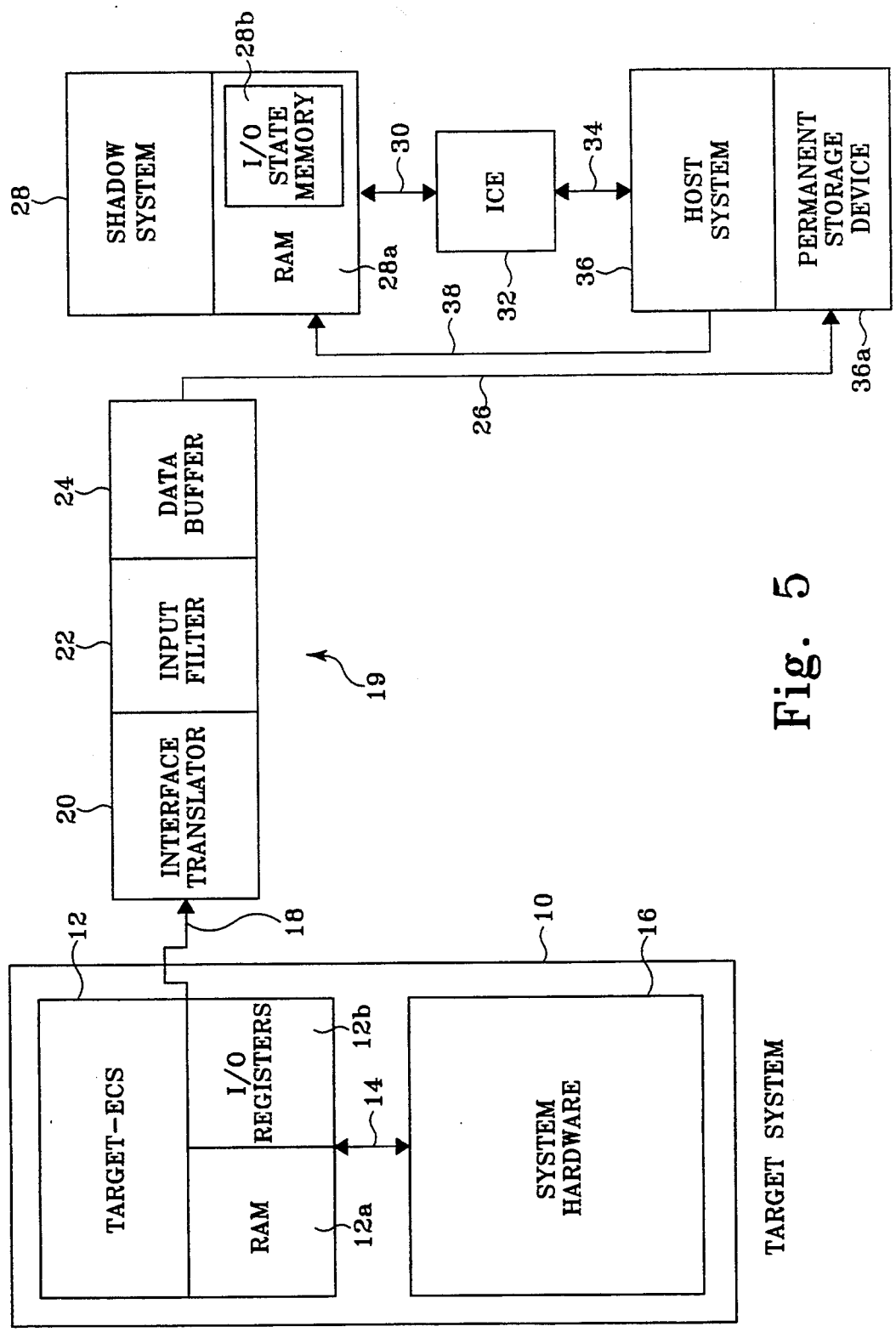
FIG. 5 illustrates an embodiment of the invention for environments that require monitoring of a target-ECS for extremely long periods of time to trap the real time events surrounding a particular event, i.e., a target-ECS system failure.

FIG. 5 illustrates an embodiment of the invention intended to be used in environments that require extremely long periods of target-ECS monitoring in order to trap real time events surrounding a particular event. Interface means 19 is connected to the permanent storage device 36a (as in FIG. 4). The permanent storage device 36A is, however, located between the data buffer 24 and the shadow system 28 during the shadow mode. In the embodiment of FIG. 5, the permanent storage device 36A operates as an extremely large FIFO buffer. The shadow system does not receive unique input events until the permanent storage device is nearly full. In the FIG. 5 embodiment, after a particular target event is detected, e.g., a target system failure, the shadow system 28 and the storage of unique input events can be halted and the shadow system execution state can be saved.

While the preceding description illustrates the presently known best mode for carrying out the invention, the scope of this invention is not limited, as will be apparent to those skilled in the art, to the described best mode and is limited only by the scope of the invention, following claims and the prior art.

I claim:

1. A system for re-creating the operation of a target computer system operating within a hardware system, comprising:

means for transmitting input signals from said target computer system to an interface translator, each of said input signals containing a group of bits;

said interface translator having means for receiving said input signals sent by said target computer system and for arranging the bits of said group of bits contained in each of said input signals to convert said input signals to generic input signals and for transmitting said generic input signals to an input filter;

said input filter having means for converting each of said generic input signals received from said interface translator into unique input events, each unique input event containing a synchronization word and a data word, and for sending said unique input events over a one-directional bus from said input filter to a temporary storage device;

said temporary storage device having means for retaining said unique input events until a shadow system is capable of receiving said unique input events;

said shadow system executing software which is functionally identical to software executed by said target computer system; and having means for processing and temporarily storing all data from the unique input events received from said input filter via said one-directional bus in an input/output state memory; and means for storing said data from the unique input events at specific locations within said input/output state memory;

an in-circuit emulator having electronic hardware connected to said shadow system which is hardware and software compatible with said target system and said shadow system, and providing means to control, interrogate, verify and debug said shadow system; and a host system providing high level control over said shadow system and said in-circuit emulator; said host system having means to redirect said unique input events from said shadow system to a permanent storage device; and further having means to read, set and record on said permanent storage device corresponding execution states of said shadow system including the entire contents of a temporary memory and input/output state memory located in said shadow system;

said permanent storage device having means for storing said unique input events and said corresponding execution states of said shadow system.

2. The system of claim 1 wherein said execution states are further defined as internal state vectors corresponding to the contents of said temporary memory and internal CPU registers included in said shadow system, and input state vectors and output state vectors corresponding to the contents of an input/output state memory comprising a segregated portion of said temporary shadow memory.

3. The system of claim 1 wherein said host system further includes means for re-creating the execution state of the target computer system at any desired point in time in which said unique input events were recorded by using numerical information pertaining to one of said execution states and the recorded unique input events.

4. The system of claim 3 further comprising means for defining said input state vectors to reduce the number of vectors to a minimum data set required to exactly re-create all execution states of the target computer system and store said minimum data set on said permanent storage device.

5. The system of claim 1 wherein said input filter further comprises means for providing a signal from an external source for synchronizing the time clocks of said target system and said shadow system to said external source.

6. The system of claim 1 wherein said input filter further comprises means for implementing a priority interrupt signal received by said target system from an external source and relaying said priority interrupt signal to said shadow system.

7. The system of claim 1 wherein said input filter further comprises means to convert asynchronous unique input events into synchronous input events producing "special" unique input events.

8. The system of claim 1 wherein said one-directional bus includes status lines and address lines and said interface translator includes means to access and decode said target system status and address lines to determine the memory location of memory mapped or dynamically mapped input events.

9. The system of claim 1 wherein said shadow system is adapted to obtain information from said target system in a manner that is non-intrusive to the target system hardware or software.

10. The system of claim 1 wherein said shadow system has recording rate and data storage requirements compatible with commercially accepted computer hardware and software standards.

11. The system of claim 1 wherein said target system can operate in a real or simulated environment.

12. The system of claim 1 wherein said shadow system duplicates the software instruction of said target system without interfering with the operation of said target system.

13. The system of claim 1 wherein said host system includes means for accessing and determining the exact execution state of said shadow system corresponding to each of said unique input event for debugging and developing said target system.

14. The system of claim 1 wherein said host system is connected to said shadow system via a parallel bus.

15. The system of claim 1 wherein said permanent storage device includes means to store at least 100 megabytes of data.

16. The system of claim 1 further comprising means for establishing the time period between unique input events received by said shadow system by maintaining a count of the number of data strobes or clock cycles between unique input events and for recording said time period between said unique input events on said permanent storage device.

17. The system of claim 16 wherein said means can count and record a time period between each of said unique input events when the time interval corresponding to one count is not constant.

18. The system of claim 16 wherein said host system includes means for halting said shadow system at the beginning of data recording, redirecting said unique input events to said permanent storage device and recording the execution state of said shadow system on said permanent storage device at the end of recording said unique input events.

19. The system of claim 16 wherein said input filter comprises said means for establishing the time period between unique input events received by said shadow system.

20. The system of claim 19 wherein said unique input events comprise distinct data within said permanent storage device including unique input data and data indicative of the time interval since the last unique input event.

21. A method for debugging and developing embedded computer systems including the steps of:
providing hardware and software in a host system and shadow system that is compatible with a target system;
receiving input events from said target system including input instructions and input data from at least one external source in an operating environment, each of said input events containing a group of bits;
sending said input events from said target system to an interface device having means for arranging the bits of said group of bits contained in each of said input events to convert said input signals from said target system into generic input signals;
sending said generic input signals from said interface device to an input filter having means to convert said generic signals into unique input events including a time synchronization word and an input data word which can be utilized by said shadow system;
temporarily storing said unique input events in a temporary storage device until said shadow system can receive said unique input events from said temporary device;
processing said unique input events with a central data processor of said shadow system until recording of said unique input event begins;
halting the central data processor of said shadow system at the beginning of recording said unique input events;
redirecting said unique input events received by said shadow system to a long-term storage device;
accessing and reading the complete execution state of said shadow system with an in-circuit emulator coacting with a host system at a convenient time during or after recording of said unique input events; said complete execution state including the contents of a temporary memory located within said shadow system, the internal registers of the computer and an input/output state memory comprising a segregated portion of said temporary memory; and
storing said complete execution state of said shadow system corresponding to said unique input events on said long-term storage device.

22. The method of claim 21 further including the steps of accessing said unique input events recorded on said permanent storage device and replaying said unique input events through said shadow system for analysis and development of said target-ECS operation.

23. The method of claim 21 further including the steps of resetting said shadow system to a known execution state which was stored on said long-term storage device after halting said shadow system at the beginning of data recording.

24. The method of claim 21 further comprising the steps of providing high level control of said shadow system with said in-circuit emulator and said host system.

25. The method of claim 21 wherein said host system further includes the steps of providing high level control of said shadow system during the recording of said unique input events.

26. The method of claim 21 wherein said host system further includes the steps of producing a re-creation mode providing said high level control of said shadow system during data playback from said permanent storage device through said host system to said shadow system for re-creation of target system input events and execution states.

27. The method of claim 21 further including the step of placing the data of said unique input events at specific locations within said temporary memory of said shadow system corresponding to the exact locations of said input events in said target system.

28. The method of claim 21 further including the step of storing the number of data strobes or clock cycles occurring between input events on said permanent storage device.

29. The method of claim 21 further including the step of synchronizing the time clock of said target system and said shadow system to an external time source.

30. A system for debugging or verifying the operation of a computer operating within a hardware system comprising:
a target system comprising at least one embedded computer system being analyzed; said embedded computer system having means to receive input signals from external devices, process said input signals and transmit said input signals to an interface translator, each of said input signals containing a group of bits;
said interface translator having means to receive said input signals sent by said target system and to arrange the bits of said group of bits contained in each of said input signals to convert said input signals to generic input signals and transmit said generic input signals to an input filter;
said input filter having means for converting each of said generic input signals received from said interface device into unique input events containing a synchronization word and a data word, and sending said unique input events over a one-directional bus from said input filter to a temporary storage device;
said temporary storage device having means for retaining said unique input events until the shadow system can receive said unique input events;
said permanent storage device being detachably connected to said temporary storage device via a one-directional bus during a recording mode and having means to store said unique input events during said recording mode, and further having means for storing said unique input events during said recording mode and allowing said unique input events to be retrieved and replayed through a shadow system during a re-creation mode;
an in-circuit emulator connected to said host system during said re-creation mode which is hardware and software compatible with said target system and said shadow system, said host system having means providing coaction with said in-circuit emulator during said re-creation mode to analyze the operation of said target system on said shadow system;

said shadow system being connected to said in-circuit emulator and host system during said re-creating mode and having software and hardware which is compatible with said target system; and further having means for processing and temporarily storing all the data of the unique input events replayed through said shadow system during said re-creation mode, an input/output state memory and means for storing the data of said unique input events at specific locations within said temporary memory.

31. The system of claim 30 wherein recording of said unique input events begins at a known execution state of said target computer system.

32. In a system for analyzing the operation of a target computer system operating within a hardware system, the improvement comprising:

a first one-directional bus having an input and an output, said input of said first one-directional bus being coupled to said target computer system for receiving input signals transmitted by said target computer system, said input signals containing a plurality of groups of input bits;

an interface translator having input means coupled to said output of said first one-directional bus for receiving said input signals containing said plurality of groups of input bits sent by said target computer, having means for arranging the input bits of each of said plurality of groups of input bits to convert said input signals to generic input signals, and having output means for supplying said generic input signals;

a filter device having input means coupled to said output means of said interface translator for receiving said generic input signals, having means for converting said generic input signals into unique input events containing synchronization words and data words, and having output means for supplying said unique input events;

a buffer having input means coupled to said output means of said filter device for receiving said unique input events, having means for temporarily retaining said unique input events, and having output means for supplying said temporarily retained unique input events;

a second one-directional bus having an input and an output, said input of said second one-directional bus being coupled to said output means of said buffer; and a shadow system having input means coupled to said output of said second one-directional bus for receiving said temporarily stored unique input events from said buffer, having means for storing said unique input events during a recording mode, and having means for replaying said unique input events during a re-creation mode.

33. The system of claim 32 wherein said improvement further comprises:

said shadow system having input/output means for receiving and sending signals during said re-creation mode;

a co-processor development board having means coupled to said input/output means of said of said shadow system for communicating with said shadow system; and a host system coupled to said co-processor development board for communicating with said co-processor development board, said co-processor development board and said host system co-acting to interrogate and debug said shadow system during said re-creation mode.

34. The system of claim 32 wherein said system further comprises:

a host system; and an in-circuit emulator coupled between said host system and said shadow system, said in-circuit emulator and said host system co-acting to interrogate and debug said shadow system during said re-creation mode.

35. In a method of re-creating the operation of an embedded computer having input signals, execution states and output signals, the improvement comprising the steps of:

determining said input signals of said embedded computer, said input signals containing a plurality of groups of input bits;

arranging the input bits of each of said plurality of groups of input bits to convert said input signals to generic input signals;

converting said generic input signals into unique input events containing synchronization words and data words;

temporarily retaining said unique input events; and transferring said temporarily stored unique input events to a shadow system for storing said unique input events and relative times thereof during a recording mode and for replaying said unique input events during a re-creation mode in which at any point in time during the replay of said unique input events an execution state of said shadow system directly corresponds to an execution state of said embedded computer at the same relative point in time.

36. The method of claim 35 wherein said embedded computer is a finite state sequential machine and said execution state comprises input vector data, output vector data and internal state vector data.

37. The method of claim 36 further comprising the step of manipulating said unique input event data to minimize the quantity of data to be recorded.

38. The method of claim 37 wherein said embedded computer is a target-ECS having two co-processors and wherein the step of minimizing the quantity of data to be recorded is achieved by recording only once on said permanent storage device any I/O data which is common to each of said two co-processors.

39. The method of claim 37 wherein the step of minimizing the quantity of data to be recorded is achieved by limiting a definition of unique input events to include only input data and the number of data strobes since the last unique input event was received by said shadow system.

40. The method of claim 37 wherein the step of minimizing the quantity of data to be recorded is achieved by limiting a definition of unique input events to include only input data, the number of data strobes since the last unique input event was received by said shadow system, and the number of clock cycles during which said embedded computer is in a "wait state".

41. The method of claim 37 further comprising the step of excluding unique input events containing data identical to data contained in a corresponding memory location.

* * * * *